Dec. 2, 1969  L. D. BUTLER  3,481,497
BALE WAGON CONTROL
Filed Sept. 28, 1967  4 Sheets-Sheet 1

INVENTOR.
LEE DENNIS BUTLER
BY
*Donald D. Schaper*
ATTORNEY

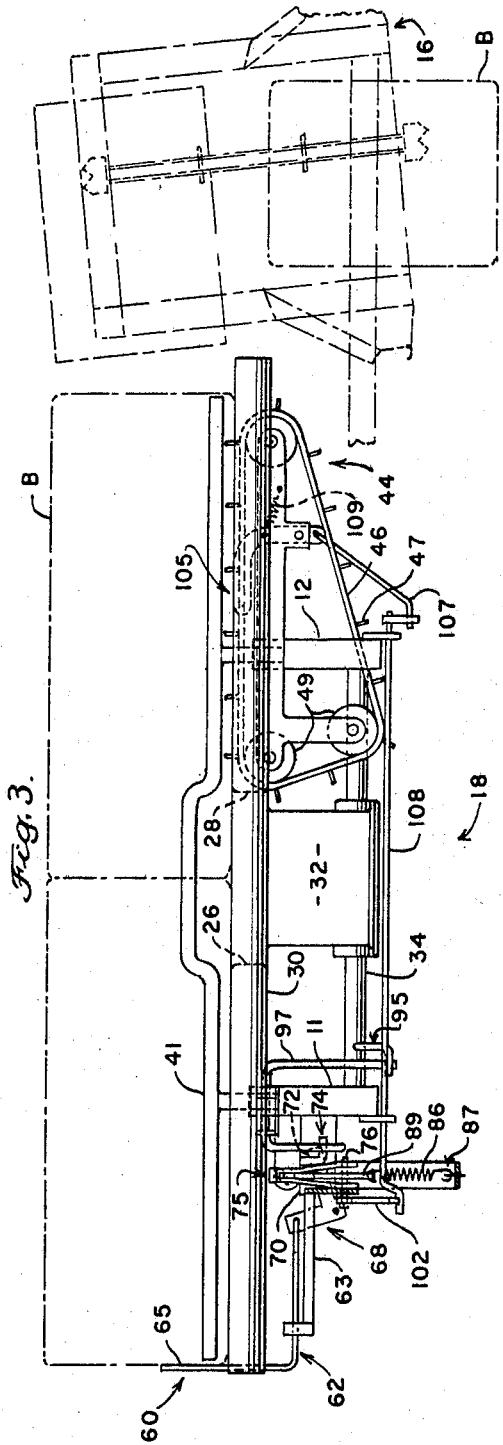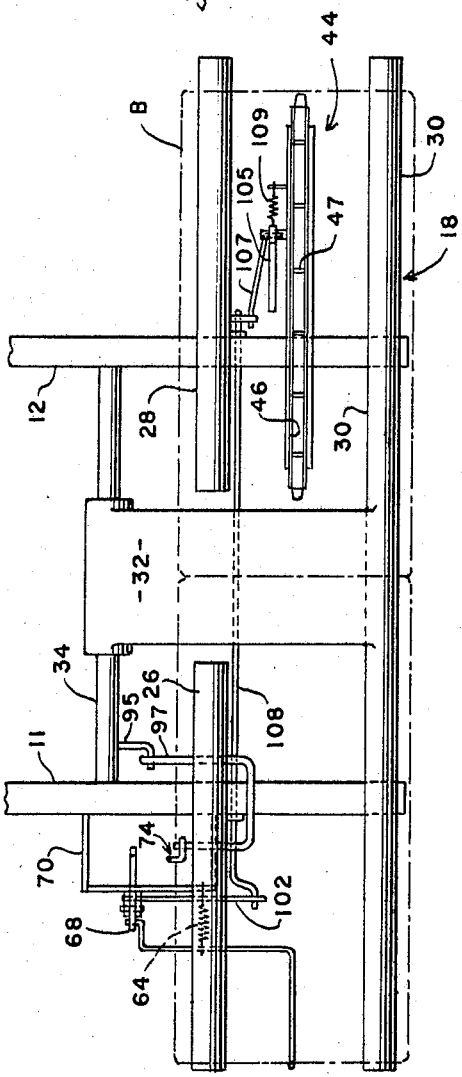
INVENTOR.
LEE DENNIS BUTLER
BY
Donald D. Schaper
ATTORNEY

INVENTOR.
LEE DENNIS BUTLER
BY
Donald D. Schaper
ATTORNEY

United States Patent Office 3,481,497
Patented Dec. 2, 1969

3,481,497
BALE WAGON CONTROL
Lee Dennis Butler, Kingsburg, Calif., assignor to Sperry Rand Corporation, a corporation of Delaware
Filed Sept. 28, 1967, Ser. No. 671,379
Int. Cl. B60p 1/04
U.S. Cl. 214—508
2 Claims

ABSTRACT OF THE DISCLOSURE

An automatic bale wagon having a receiving bed which is adapted to receive bales deposited thereon by a bale loader. A control is provided to actuate the receiving bed unloading mechanism when the bed has been fully loaded. The control comprises a bale actuated trip and an over-center mechanism operatively connected to the trip to insure positive actuation of the unloading mechanism.

BACKGROUND OF THE INVENTION

This invention is particularly applicable to a bale wagon which is adapted to automatically load and stack bales from a field. In one known bale wagon of this type, a bale loader at the forward end of the chassis lifts bales from the ground and deposits them on a transversely extending receiving bed. The receiving bed accumulates a row of bales and then elevates the row onto a generally horizontal transfer bed. When a plurality of rows have been received on the transfer bed to form a layer of bales, the transfer bed is pivoted upwardly to deposite the layer in a vertical stack on a load-carrying bed. Bale actuated trip means are provided to actuate the elevating means of both the receiving bed and the transfer bed.

The receiving bed trip mechanism is located at an end of the receiving bed opposite the bale loader and is designed to operate when the bed has been fully loaded, a load consisting of two or three bales. A cross-conveyor is located adjacent bale loader and serves to move the bales across the receiving bed. When the last bale is loaded onto the receivig bed, it is conveyed against the next adjacent bale, and all of the bales are moved laterally so that the first bale is moved into contact with the trip mechanism.

It is common for the bale wagons to load and stack several bales per minute. Thus, the elevating mechanism must operate at sufficient speed to unload the receiving bed before a new bale has been elevated to the bed by the bale loader. Heretofore, the trip mechanism has been operatively connected to a valve which controls a hydraulic actuator for elevating the receiving bed. In some cases, the trip mechanism will only partially open the valve, and thus the hydraulic actuator does not operate at full speed. When this happens, the operator must slow the wagon down so that the receiving bed will be down in time to receive the next bale from the loader.

SUMMARY OF THE INVENTION

This invention relates to a bale wagon control for positively actuating the bale elevating mechanism in a bale wagon of the type described. The invention is particularly applicable to a bale wagon of the type disclosed in U.S. Patent No. 2,848,127.

The bale wagon control includes a trip at one end of the receiving bed which is bale actuated when the receiving bed has been fully loaded. The trip is operatively connected to a lever which is movable between two overcenter positions to open and close a fluid control valve. The valve controls fluid to a hydraulic cylinder which raises a pivotally mounted section of the receiving bed to elevate the bales to a transfer bed located rearwardly of the receiving bed. When the trip has moved the lever to a first over-center position, the fluid control valve is fully open to admit fluid to the hydraulic cylinder and elevate the bales on the receiving bed. When the pivotally mounted section of the receiving bed has reached a generally vertical position, a trip pin on the receiving bed moves the lever to a second over-center position to quickly close the valve and cause the receiving bed to drop to its load-receiving position.

A locking device is provided to prevent movement of the over-center mechanism, except when the receiving bed is fully loaded. Thus, if a bale should happen to move into contact with the trip, before the bed is fully loaded, the bed will remain in a load-receiving position. When the last bale is loaded onto the receiving bed, the locking mechanism is deactivated, and the trip is then free to operate.

A principal object of this invention is to provide a bale wagon control which positively actuates a bale elevating device when a predetermined number of bales have been accumulated in a desired location on the wagon.

Another object of this invention is to provide, in a bale wagon of the type described, a means for fully actuating a fluid control valve when a trip mechanism has been contacted by bales on the wagon.

A further object of this invention is to provide a bale wagon trip mechanism having an over-center actuating device incorporated therein.

Other objects of this invention will be apparent hereinafter from the specification and from the recital in the appended claims.

BRIEF DESCRIPTION OF THE DRAWINGS

FIG. 3 is an end view looking toward the left in FIG. 1, and drawn on a somewhat reduced scale.

FIG. 4 is a plan view of FIG. 3.

DESCRIPTION OF THE PREFERRED EMBODIMENT

Figure 1:
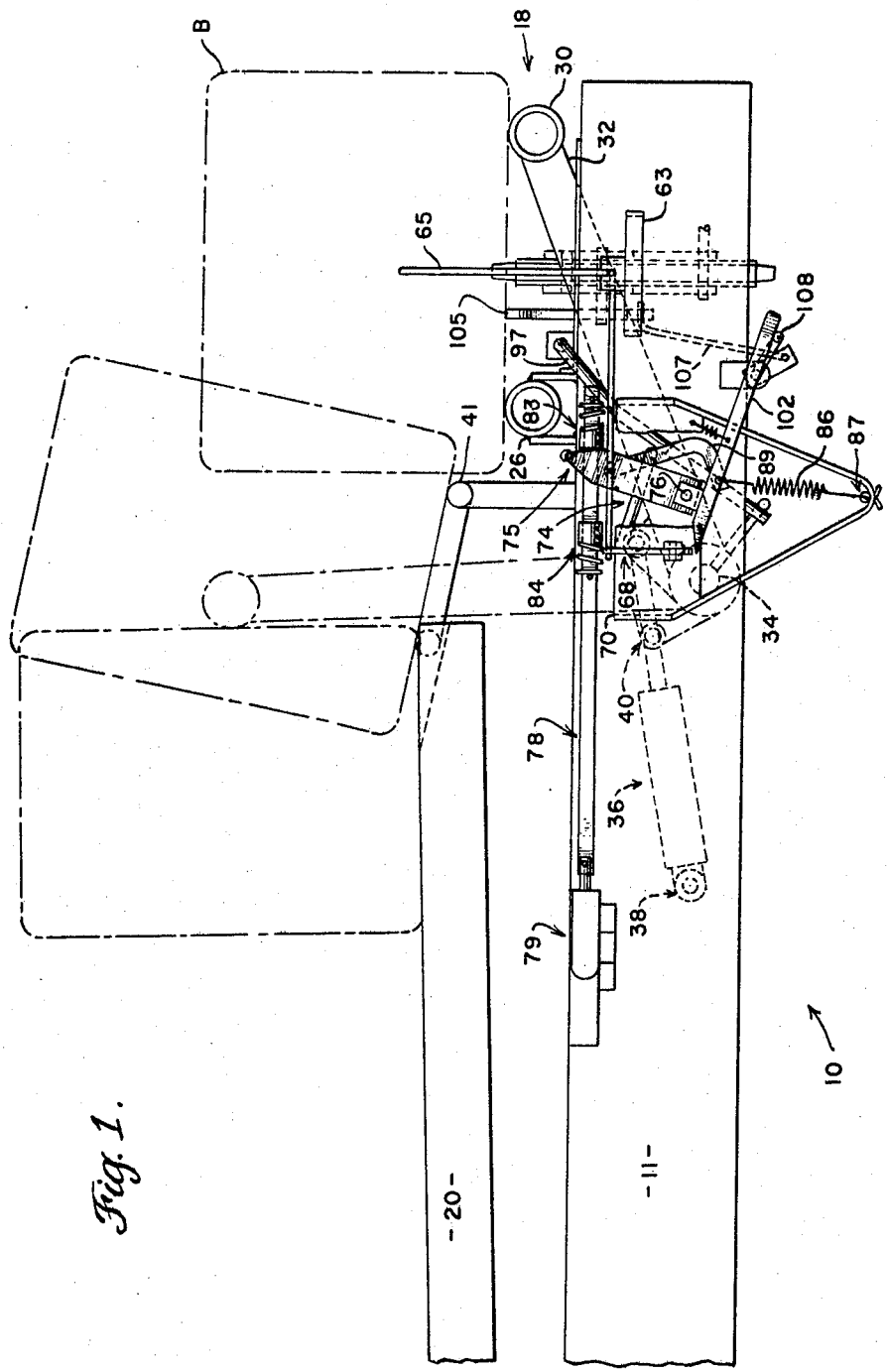
FIG. 1 is a fragmentary side elevational view showing the receiving bed at the forward end of a bale wagon and the control for the receiving bed elevating mechanism.
Figure 2:
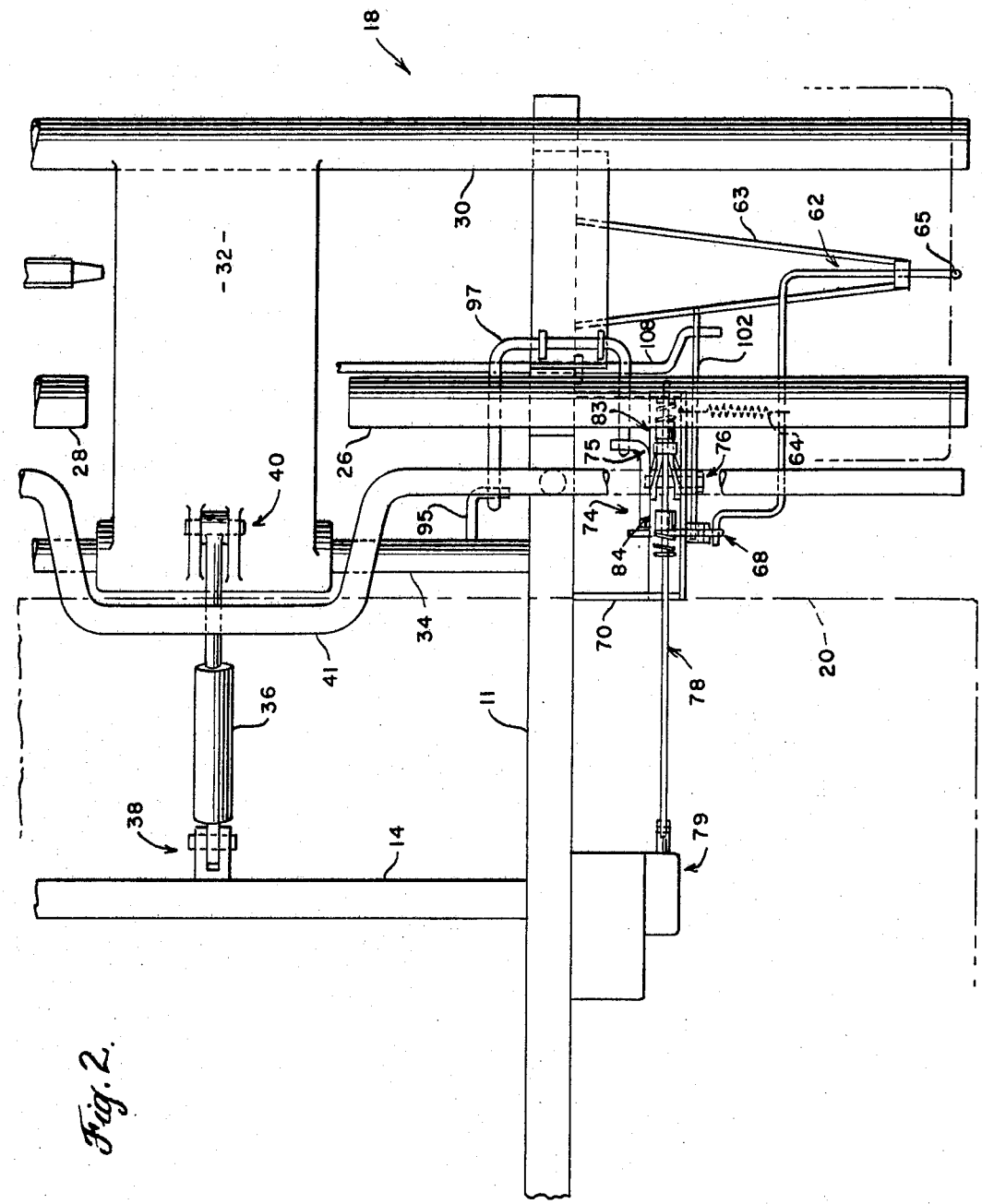
FIG. 2 is a plan view of FIG. 1.

Referring now to the drawings by numerals of reference, and particularly to FIGS. 1 and 2, a bale wagon chassis 10 is shown which comprises longitudinal frame members 11 and 12 and cross member 15. A bale loader 16, shown in phantom in FIG. 3, is mounted on one side of the chassis at the forward end thereof. A receiving bed 18 is pivotally mounted on chassis 10 adjacent bale loader 16 and is adapted to receive bales B from the loader and to deposit them on a transfer bed 20 carried on the chassis 10 and located rearwardly of the receiving bed 18.

Receiving bed 18 comprises elements 26 and 28 which form the rear side of the receiving bed and are fixed respectively to frame members 11 and 12. The forward side of the receiving bed 18 is formed by a pivotally movable transversely extending bar 30. Bar 30 is fixed to a lift arm 32 which is carried on a cross shaft 34 pivotally mounted to frame members 11 and 12. Bed 18 is elevated by a hydraulic cylinder 36 pinned to frame member 14 at 38 and to lift arm 32 at 40. As the bales are elevated by bar 30, the rear sides of the bales are supported by an element 41 fixed to chassis 10 (see FIG. 3).

Bale loader 16, as shown in FIG. 3, is adapted to elevate the bales from the ground and laterally deflect them onto the receiving bed 18 at one end thereof. A conveyor 44 is mounted on frame member 12 between receiving bed element 28 and bar 30. Conveyor 44 comprises a chain 46 having lugs 47 thereon which contact a bale to move it laterally across the bed 18. Chain 46 extends around sprockets 49 and is driven by a hydraulic motor, not shown.

Figure 6:
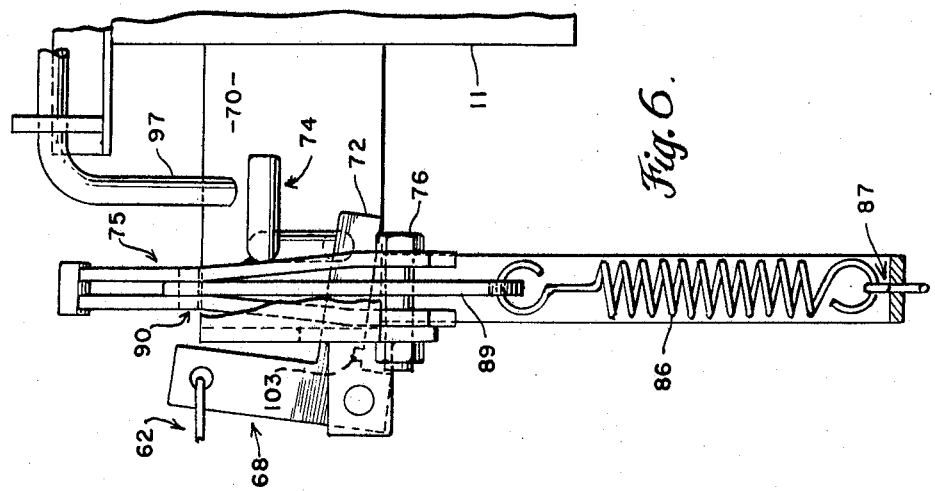
FIG. 6 is a view looking toward the left in FIG. 5.
Figure 5:
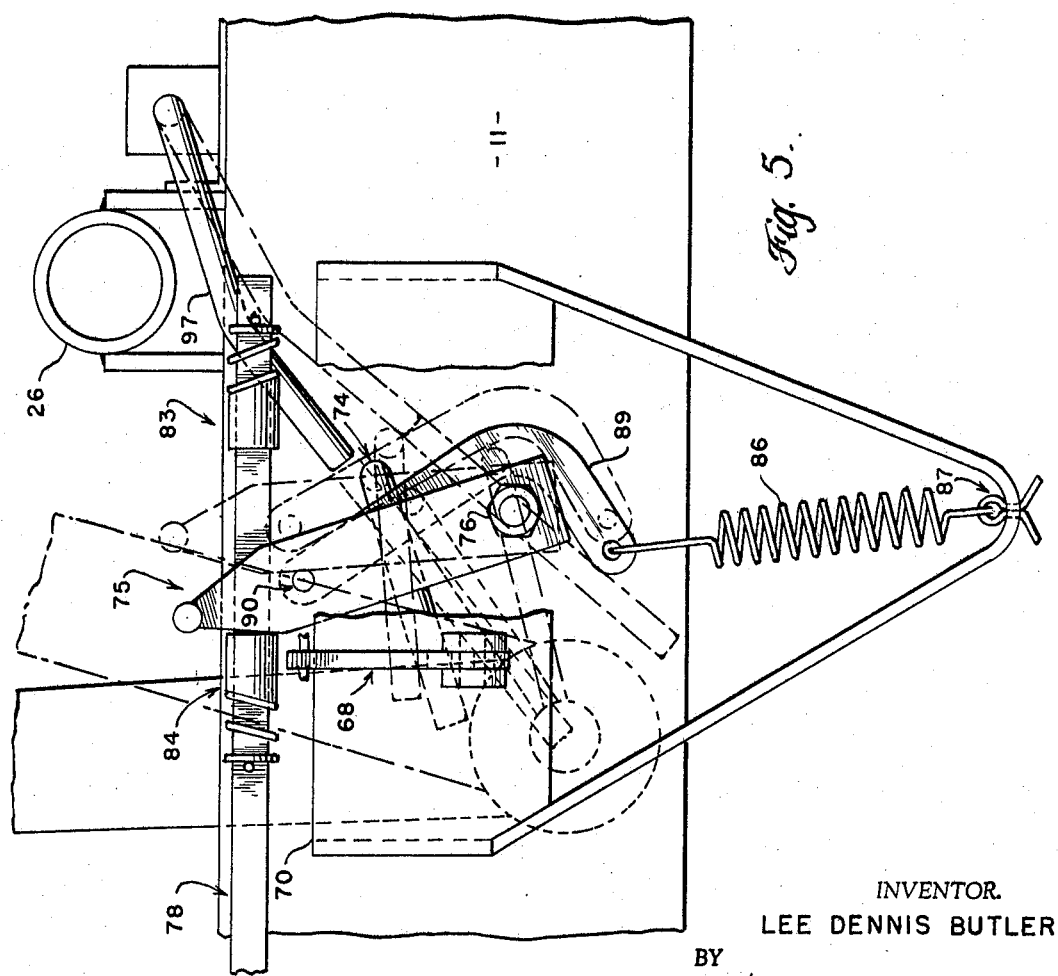
FIG. 5 is an enlarged view of the over-center device in the bale wagon control.

A control 60 is located at one end of the receiving bed 18 and is adapted to actuate hydraulic cylinder 36 when the receiving bed has been fully loaded. Control 60 comprises a trip rod 62 which is slidably mounted in a bracket 63 fixed to frame member 11. Trip rod 62 is biased in an inward position by a spring 64 and has an end portion 65 which extends above receiving bed 18 and is adapted to contact the bales. At its opposite end, rod 62 is fixed to a bell crank 68 pivotally carried on a mounting bracket 70. A leg 72 of bell crank 68 is adapted to contact a generally L-shaped rod 74 which is welded to a forked lever 75. Lever 75 is pivotally carried on a fastener 76 fixed to mounting bracket 70. As shown in FIGS. 1, 5, and 6, lever 75 slidably receives a valve control bar 78 which is conencted to a valve 79. Spring stops 83 and 84 are fixed to bar 78 for engagement with lever 75. A spring 86 is adapted to hold lever 75 in an over-center position. Spring 86 is pinned to bracket 70 at 87 and is connected to lever 75 through an angled element 89 connected to lever 75 at 90.

When bed 18 is fully loaded, trip rod 62 pivots bell crank 68 upwardly into contact with rod 74 to move lever 75 to a first over-center position, shown in FIG. 1. As lever 75 moves to this first position, it moves bar 78 to the right to open valve 79. When valve 79 is opened, fluid is admitted to cylinder 36 to raise bar 30. Lever 75 is moved to a second over-center position, shown in FIG. 5, by a trip pin 95 fixed to shaft 34 and adapted to contact a U-shaped element 97 when arm 32 reaches a generally vertical position. U-shaped element 97 is pivotally mounted on frame member 11, and when pivoted upwardly by trip pin 95, it will move into contact with rod 74 to push the lever 75 back over center to lower the table.

A locking mechanism is provided to prevent actuation of control 60, except when bed 18 is fully loaded. The locking mechanism comprises a lever 102 which is moved into and out of a groove 103 (see FIG. 6) in leg 72 of bell crank 68. Lever 102 is actuated by a pivotally mounted finger 105 which extends above the receiving bed adjacent conveyor 44. Finger 105 is connected to lever 102 through links 107 and 108 and is biased in an "up" position by spring 109. When finger 105 is in an "up" position, lever 102 will be in groove 103 to prevent movement of bell crank 68. When a bale contacts finger 105 on the receiving bed, the finger 105 is depressed and lever 102 will be moved out of the groove 103. Thus, it will be seen that when two bales have been received on the receiving bed, finger 105 will be depressed and end 65 of trip rod 62 will be contacted to operate the control 60.

It will be seen from the foregoing description that quick and positive actuation of the valve 79 is obtained through the use of the disclosed control. Any movement of the trip rod 62 which is sufficient to move lever 75 over center will fully open valve 79 to elevate bar 30 at full speed.

Operation of the receiving bed 18 and the control means for the receiving bed is as follows:

Bales B are picked up from the field by bale loader 16 and deposited on the receiving bed 18. A first bale loaded on the receiving bed will be moved across the bed by conveyor 44. Conveyor 44 is spaced more than one bale length from trip 60 so that the first bale will not contact the trip mechanism. A second bale loaded onto the receiving bed will be moved into contact with the first bale by the conveyor 44. Since finger 105 is depressed by the second bale, the locking mechanism is inoperative and control 60 will be actuated by the first bale. When the first bale moves trip rod 62 laterally outward, rod 62 will pivot bell crank 68 in a counterclockwise direction, as viewed in FIG. 3. Leg 72 of bell crank 68 moves upward into contact with rod 74 which causes lever 75 to be moved to a first over-center position, shown in FIG. 1. When lever 75 is in the position shown in FIG. 1, the bales on receiving bed 18 will be elevated to the transfer bed 20. When lift arm 32 is in a substantially vertical position, trip rod 95 moves U-shaped element 97 into contact with rod 74 to move lever 75 to the second over-center position, shown in FIG. 5. When lever 75 is in the position shown in FIG. 5, fluid pressure is removed from cylinder 36, and bar 30 drops quickly to a horizontal load-receiving position.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention.

I claim:

1. A bale wagon having a chassis structure, bed means on said chassis structure including a receiving bed and a transfer bed, said receiving bed being pivotally mounted on said chassis and adapted to receive and accumulate a plurality of bales and deposit said bales on said transfer bed, hydraulic cylinder means on said chassis for pivoting said receiving bed and control means operatively connected to said cylinder means for actuating said cylinder means in response to contact with bales on said receiving bed, said control means comprising a trip mechanism engageable with said bales, lever means, a bell crank operably connecting said trip mechanism and said lever means, spring means fixed by one end to said chassis and by the other end to said lever means intermediate the ends thereof, valve means operably connected to said cylinder means and having first and second operative positions, said lever means being pivotally connected by one end to said chassis and slidably connecting said valve adjacent the other end thereof whereby said spring means urges said lever means to first and second positions left and right of center causing the valve means to assume first and second positions to raise and lower said receiving bed.

2. A bale wagon, as recited in claim 1, wherein a locking means engageable with said bell crank permits actuation of said control means only when said receiving bed is fully loaded.

References Cited

UNITED STATES PATENTS 2,848,127  8/1958  Grey.
3,289,859  12/1966  Tarbox.
3,330,424  7/1967  Grey et al.

ALBERT J. MAKAY, Primary Examiner

U.S. Cl. X.R.

214—6, 519